US012539791B2

United States Patent
Oltman et al.

(10) Patent No.: US 12,539,791 B2
(45) Date of Patent: Feb. 3, 2026

(54) CHILD RESTRAINT

(71) Applicant: Dorel Juvenile Group, Inc., Foxboro, MA (US)

(72) Inventors: Stephen B. Oltman, Hope, IN (US); Jeffrey A. Pemberton, North Attleboro, MA (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 206 days.

(21) Appl. No.: 18/377,415

(22) Filed: Oct. 6, 2023

(65) Prior Publication Data

US 2024/0116410 A1 Apr. 11, 2024

Related U.S. Application Data

(60) Provisional application No. 63/414,145, filed on Oct. 7, 2022.

(51) Int. Cl.
*B60N 2/28* (2006.01)

(52) U.S. Cl.
CPC ......... *B60N 2/2806* (2013.01); *B60N 2/2816* (2023.08); *B60N 2/2821* (2013.01); *B60N 2/2869* (2013.01); *B60N 2/286* (2013.01)

(58) Field of Classification Search
CPC .. B60N 2/2816; B60N 2/2818; B60N 2/2821; B60N 2/286; B60N 2/2869; B60N 2/2806
See application file for complete search history.

(56) References Cited

U.S. PATENT DOCUMENTS

| | | | | |
|---|---|---|---|---|
| 6,554,358 B2* | 4/2003 | Kain | .................... | B60N 2/2875 297/256.16 |
| 7,357,451 B2* | 4/2008 | Bendure | .............. | B60N 2/2869 297/256.12 |
| 8,322,788 B2* | 12/2012 | Williams | ............. | B60N 2/2821 297/256.16 |

* cited by examiner

*Primary Examiner* — Milton Nelson, Jr.
(74) *Attorney, Agent, or Firm* — Barnes & Thornburg LLP

(57) ABSTRACT

A child restraint includes a seat base adapted to be secured to a vehicle seat. The seat base includes a seat-base foundation formed to include a vehicle seatbelt path and a vehicle seatbelt retainer coupled to the seat-base foundation and configured to pivot between a released position spaced away from the vehicle seatbelt path and a clamped position overlying the vehicle seatbelt path to clamp a vehicle seat belt to the seat-base foundation to secure the seat base to the vehicle seat. The child restraint further includes a juvenile seat adapted to be secured to the seat base and a seat connection system configured to maintain connection between the juvenile seat and the seat base.

11 Claims, 2 Drawing Sheets

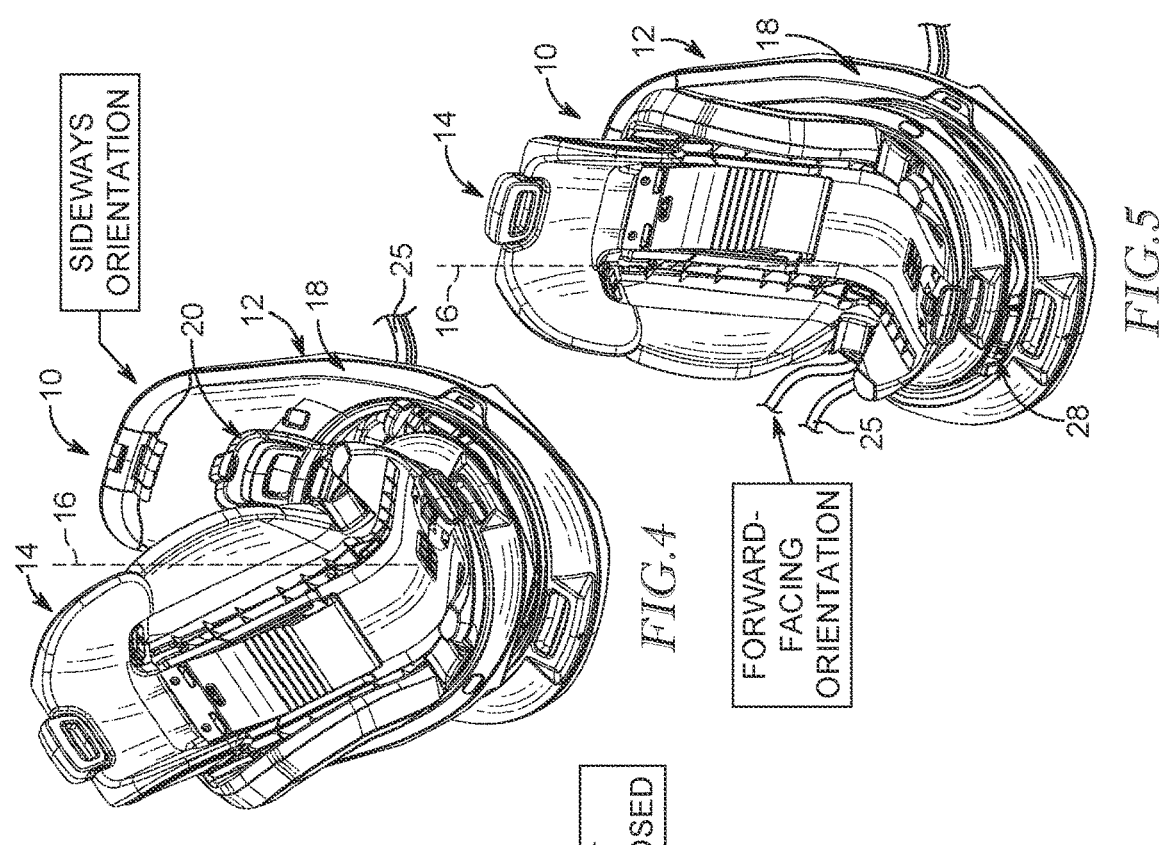
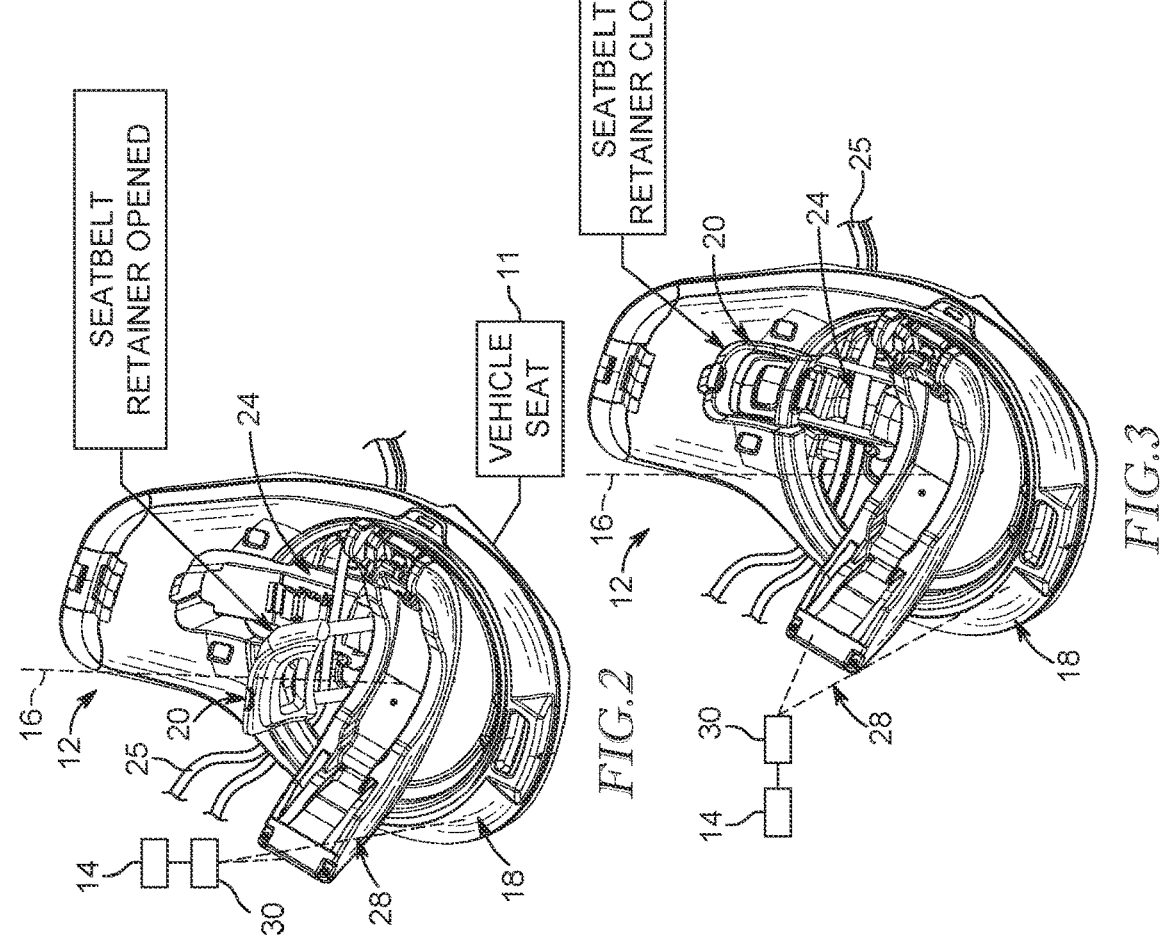

CHILD RESTRAINT

PRIORITY CLAIM

This application claims priority under 35 U.S.C. § 119(e) to U.S. Provisional Application Ser. No. 63/414,145, filed Oct. 7, 2022, which is expressly incorporated by reference herein.

BACKGROUND

The present disclosure relates to child safety devices, and particularly to child seats. More particularly, the present disclosure relates to child seat for use in a vehicle.

SUMMARY

According to the present disclosure, a child restraint, in accordance with the present disclosure, includes a seat base adapted to be secured to a vehicle seat. The seat base includes a seat-base foundation formed to include a vehicle seatbelt path and a vehicle seatbelt retainer coupled to the seat-base foundation. The vehicle seatbelt retainer is configured to pivot between an opened or released position and a closed or clamped position. In the released position, the vehicle seatbelt retainer is spaced away from the vehicle seatbelt path. In the clamped position, the vehicle seatbelt retainer overlies the vehicle seatbelt path and clamps a vehicle seat belt to the seat-base foundation to secure the seat base to the vehicle seat.

In illustrative embodiments, the child restraint further includes a juvenile seat coupled to the seat base and a seat connection system configured to maintain connection between the juvenile seat and the seat base. The juvenile seat is movable relative to the seat base between a use position and a base-installation position. In the use position, the juvenile seat is installed upright on the seat base and is configured to hold a child for transportation in a vehicle. In the base-installation position, the juvenile seat is detached from the seat base to provide clearance for the seatbelt retainer to move between the released position and the clamped position. The seat connection system includes a seat lock and a key or tool used to lock and unlock the seat lock. When the seat lock is locked, the juvenile seat is blocked from being removed from the seat base.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective and diagrammatic view of a child restraint including seat base and a juvenile seat adapted to be secured to the seat base, the seat base having a seat-base foundation configured to mount to a vehicle seat and a vehicle seatbelt retainer configured to move from a released or opened position to expose a belt path surface of the seat base foundation and a clamped or closed position to clamp a vehicle seatbelt to the seat-base foundation while the juvenile seat is at least partially separated from the seat base, and showing that the child restraint further includes a seat connection system having a seat lock configured to retain the juvenile seat to the seat base and a tool configured to change the seat lock from a locked state to an unlocked state so that the juvenile seat is free to detach from the seat base to access the vehicle seatbelt retainer;

FIG. 2 is a perspective and diagrammatic view of the of the seat base showing the seatbelt retainer in the opened position to expose the belt path surface of the seat base foundation;

FIG. 3 is a view similar to FIG. 2 showing the seatbelt retainer in the closed position clamping the vehicle seat belt to the seat-base foundation;

Figure 1:
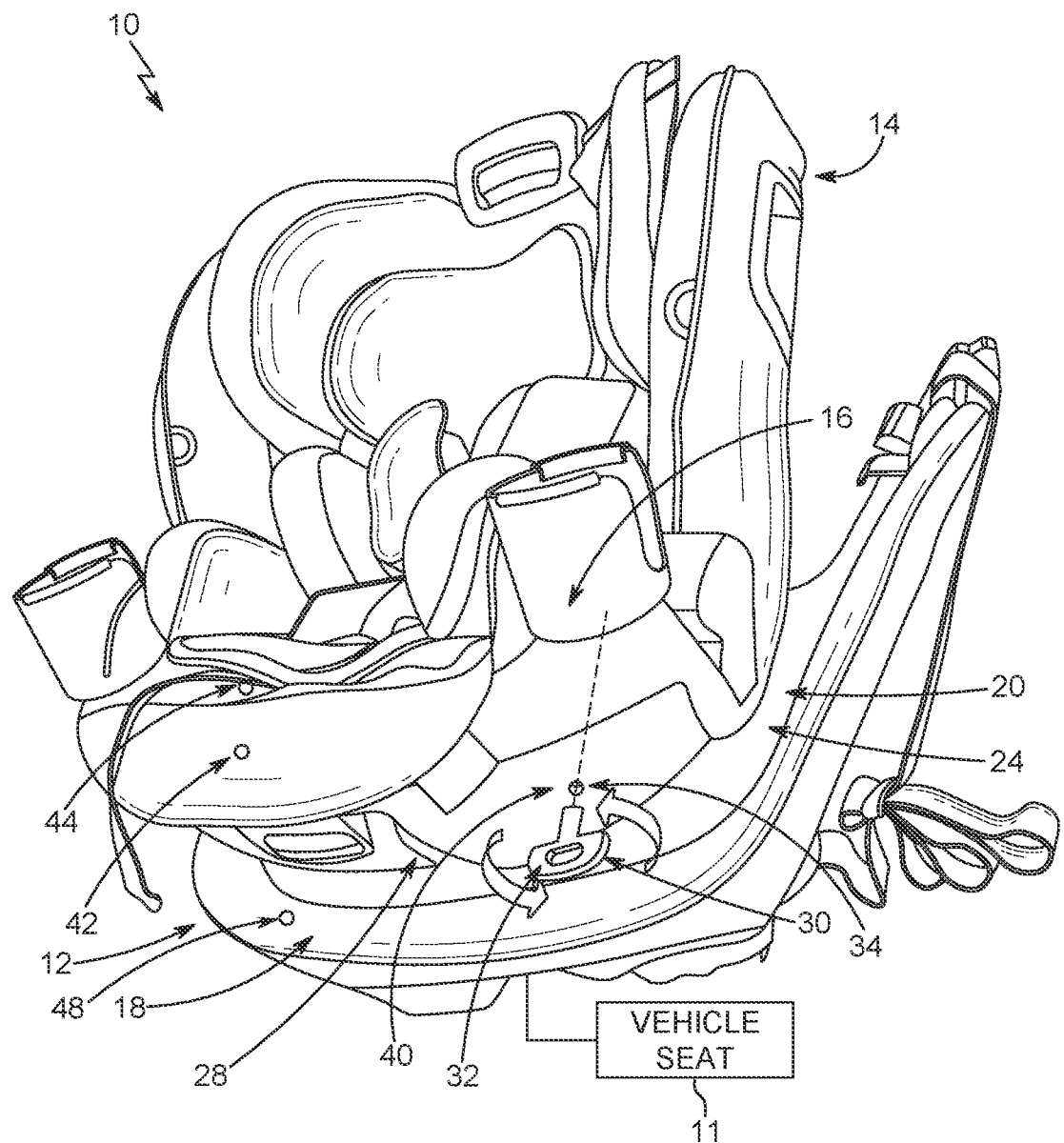

FIG. 4 is a perspective view showing the juvenile seat mounted on the seat base in the use position and oriented in a sideways orientation after the seat-belt retainer has been moved to the closed position to clamp the vehicle seat belt to the seat-base foundation; and FIG. 5 is a perspective view showing the juvenile seat in the use position and rotated relative to the seat-base foundation to a forward-facing orientation to overlie the seat-belt retainer while the seat belt retainer is in the closed position.

DETAILED DESCRIPTION

A child restraint 10 includes a seat base 12 adapted to rest on a vehicle seat 11 and a juvenile seat 14 coupled to the seat base 12 as shown in FIG. 1. The juvenile seat 14 is rotatable about a vertical rotation axis 16 to change the juvenile seat 14 from a forward facing orientation to a rearward facing orientation relative to the seat base 12. In some embodiments, the juvenile seat 14 is at least partially detachable from the seat base 12 so that the seat base 12 can be secured properly to the vehicle seat 11 prior to arrangement of the juvenile seat 14 in the forward facing orientation or the rearward facing orientation.

The seat base 12 includes a seat base foundation 18 and a vehicle seat-belt retainer 20 mounted to the seat base foundation 18 for pivotable movement about a retainer axis between a released position and a clamped position. In the released position, a distal end of the vehicle seat-belt retainer 20 is spaced apart from the seat base foundation 18 to expose a vehicle seatbelt path 24. In the clamped position, the vehicle seat-belt retainer 20 overlies the vehicle seatbelt path 24 and is configured to clamp a vehicle seat belt between the vehicle seatbelt retainer 20 and the seat base foundation 18 to secure the seat base 12 to the vehicle seat 11. Reference is hereby made to U.S. Publication No. US-2023/0045293 filed Aug. 5, 2022 and entitled SEAT BASE FOR A CHILD RESTRAINT for disclosure relating to use of a vehicle seat-belt retainer, which application is hereby incorporated in its entirety herein.

The seat base 12 may further include a seat-orientation controller 28 coupled to the seat-base foundation 18 as shown in FIG. 1. The seat-orientation controller 28 is configured to secure the juvenile seat 14 to the seat base 12 and allows selective rotation of the juvenile seat 14 relative to the seat base foundation 18 about the vertical rotation axis 16 with the juvenile seat 14. The seat-orientation controller 28 may also allow selective recline of the juvenile seat 14 relative to the seat base foundation 18. In some embodiments, the vehicle seatbelt retainer 20 may only be able to move from the clamped position to the release position when the juvenile seat 14 is at least partially detached from the seat-orientation controller 28. Reference is hereby made to U.S. Provisional Application No. 63/419,505 filed Oct. 26, 2022 and entitled CHILD RESTRAINT for disclosure relating to use of a seat-orientation controller for juvenile seat attachment, rotation, and recline capabilities, which application is hereby incorporated in its entirety herein.

The child restraint 10 in the illustrative embodiment further includes a connector system 30 configured to block detachment of the juvenile seat 14 from the seat base 12 when the juvenile seat 14 is arranged on the seat-orientation controller 28 as shown in FIG. 1. The connector system 30 includes and a seat lock 32 and a key or tool 34 configured to change the seat lock 32 between a locked state and an unlocked state. In the locked state, the seat lock 32 blocks separation of the juvenile seat 14 from the seat base 12. In the unlocked state, the juvenile seat 14 is free to be separated from the seat base 12.

The tool 34 is configured to fit with the seat lock 32 such that the tool 34 is capable of changing the seat lock 32 between the locked state and the unlocked state. After the juvenile seat 14 is arranged on the seat-orientation controller 28, a user may insert the tool 34 into the seat lock 32. Once engaged with the seat lock 32, the tool 34 may be turned in a first direction to change the seat lock 32 from the unlocked state to the locked state. In the locked state, the juvenile seat 14 is secured to the seat base 12. In some embodiments, the seat lock 32 may automatically establish the locked state once the juvenile seat 14 is mounted onto the seat base 12.

To detach the juvenile seat 14 from the seat-orientation controller 28, the user inserts the tool 34 into the seat lock 32 and turns the tool 34 in a second direction opposite the first direction to change the seat lock 32 from the locked state to the unlocked state. With the juvenile seat 14 detached from the seat base 12, a user can access the vehicle seatbelt retainer 20 to properly secure the seat base 12 to the vehicle seat 11.

In one embodiment, the seat lock 32 is located at least partially internal to the juvenile seat 14. The juvenile seat 14 may be formed to include one or more apertures 40, 42, 44 which lead to the seat lock 32. The aperture 40, 42, 44 may be located anywhere on the juvenile seat 14. In some embodiments, the aperture 42, 44 is positioned in proximity to a locking unit (not shown) associated with retaining the juvenile seat 14 to the seat base 12 so that the tool 34 can lock or unlock the locking unit. In another embodiment, the seat lock 32 is located at least partially internal to the seat-base foundation 18. In some embodiments, the seat lock 32 is located at least partially internal to the seat-orientation controller 28. In some embodiments, the tool 34 may engage with the seat lock 32 and change the seat lock 32 between the unlocked state and the locked state without requiring turning of the tool 34. In some embodiments, the seat-base foundation is formed to include an aperture 48 configured to receive the tool 34 and the juvenile seat 14 is attachable directly to the seat-base foundation 18 and lockable with the tool 34 and the seat lock 32 located internal to the seat-base foundation 18.

FIGS. 2-5 show the seat base 12 in various positions with juvenile seat 14. FIG. 2 shows the vehicle seatbelt retainer unlocked from the seat-base foundation 18 and in the opened position exposing the seatbelt path 24. To assume the opened position, the seat-orientation controller 28 has been rotated about the vertical rotation axis 16 to a sideways orientation. The juvenile seat 14 is shown diagrammatically in FIGS. 5 and 6 in the base-installation position while the seat-orientation controller 28 is in the sideways orientation. In these positions, the juvenile seat 14 and the seat-orientation controller 28 provide clearance for a user to open the seatbelt retainer 20 and route a vehicle seatbelt 25 across the seatbelt path 24 of the seat-base foundation 18. Once the vehicle seatbelt 25 is placed within the seatbelt path 24 the seatbelt retainer 20 can be pivoted to the closed position to clamp the vehicle seatbelt 25 in place and secure the child restraint 10 to the vehicle seat 11.

FIGS. 4 and 5 show the juvenile seat 14 in the use position after the seatbelt retainer 20 has been moved to the clamped position. The use position of the juvenile seat 14 can be a sideways orientation facing a door of the vehicle for child ingress and egress or a transportation orientation (i.e. forward-facing or rearward facing) for child transportation in the vehicle. It should be appreciated that the seat-orientation controller 28 is movable with the juvenile seat 14 to the sideways orientation or the transportation orientation.

The invention claimed is:

1. A child restraint comprising
a seat base adapted to be secured to a vehicle seat, the seat base comprising a seat-base foundation formed to include a vehicle seatbelt path and a vehicle seatbelt retainer coupled to the seat-base foundation and configured to pivot between a released position spaced away from the vehicle seatbelt path and a clamped position overlying the vehicle seatbelt path to clamp a vehicle seat belt to the seat-base foundation to secure the seat base to the vehicle seat,
a juvenile seat configured to be installed on the seat base and movable relative to the seat base between a use position in which the juvenile seat is installed on the seat base, and a base-installation position, in which the juvenile seat is separated from the seat base, and
a seat connection system configured to maintain connection between the juvenile seat and the seat base, the seat connection system including a seat lock and a tool configured to engage with the seat lock to change the seat lock from a locked state blocking separation of the juvenile seat from the seat base and an unlocked state where the juvenile seat is free to separate from the seat base,
wherein at least one of the seat base and the juvenile seat is formed to include an aperture leading to the seat lock and the tool includes a key configured to be inserted into the aperture and rotated within the aperture to change the seat lock from the locked state to the unlocked state, and
wherein the seat lock automatically assumes the locked state when the juvenile seat is installed on the seat base in the use position.

2. The child restraint of claim 1, wherein the seat base further includes a seat-orientation controller coupled to the seat-base foundation and wherein the juvenile seat is configured to attach to the seat-orientation controller to move with the seat-orientation controller relative to the seat-base foundation and the vehicle seatbelt retainer about a vertical rotation axis.

3. A child restraint comprising
a seat base adapted to be secured to a vehicle seat, the seat base comprising a seat-base foundation formed to include a vehicle seatbelt path and a vehicle seatbelt retainer coupled to the seat-base foundation and configured to pivot between a released position spaced away from the vehicle seatbelt path and a clamped position overlying the vehicle seatbelt path to clamp a vehicle seat belt to the seat-base foundation to secure the seat base to the vehicle seat,
a juvenile seat configured to be installed on the seat base and movable relative to the seat base between a use position in which the juvenile seat is installed on the seat base, and a base-installation position, in which the juvenile seat is separated from the seat base, and a seat connection system configured to maintain connection between the juvenile seat and the seat base, the seat connection system including a seat lock and a tool configured to engage with the seat lock to change the seat lock from a locked state blocking separation of the juvenile seat from the seat base and an unlocked state where the juvenile seat is free to separate from the seat base, wherein at least one of the seat base and the juvenile seat is formed to include an aperture leading to the seat lock and the tool includes a key configured to be inserted into the aperture and rotated within the aperture to change the seat lock from the locked state to the unlocked state, and wherein the seat base further includes a seat-orientation controller coupled to the seat-base foundation and wherein the juvenile seat is configured to attach to the seat-orientation controller to move with the seat-orientation controller relative to the seat-base foundation and the vehicle seatbelt retainer about a vertical rotation axis.

4. The child restraint of claim 3, wherein the aperture is formed in a seat bottom of the juvenile seat in proximity to the seat-orientation controller when the juvenile seat is in the use position.

5. The child restraint of claim 3, wherein the seat base is formed to include the aperture leading to the seat lock.

6. The child restraint of claim 5, wherein the seat lock automatically assumes the locked state when the juvenile seat is installed on the seat base in the use position.

7. A child restraint comprising a seat base adapted to be secured to a vehicle seat, the seat base comprising a seat-base foundation formed to include a vehicle seatbelt path and a vehicle seatbelt retainer coupled to the seat-base foundation and configured to pivot between a released position spaced away from the vehicle seatbelt path and a clamped position overlying the vehicle seatbelt path to clamp a vehicle seat belt to the seat-base foundation to secure the seat base to the vehicle seat, a juvenile seat configured to be installed on the seat base and movable relative to the seat base between a use position in which the juvenile seat is installed on the seat base, and a base-installation position, in which the juvenile seat is separated from the seat base, and a seat connection system configured to maintain connection between the juvenile seat and the seat base, the seat connection system including a seat lock and a tool configured to engage with the seat lock to change the seat lock from a locked state blocking separation of the juvenile seat from the seat base and an unlocked state where the juvenile seat is free to separate from the seat base, wherein at least one of the seat base and the juvenile seat is formed to include an aperture leading to the seat lock and the tool is configured to be inserted into the aperture to change the seat lock from the locked state to the unlocked state, and wherein the seat lock automatically assumes the locked state when the juvenile seat is installed on the seat base in the use position.

8. The child restraint of claim 7, wherein the seat base further includes a seat-orientation controller coupled to the seat-base foundation and wherein the juvenile seat is configured to attach to the seat-orientation controller to move with the seat-orientation controller relative to the seat-base foundation and the vehicle seatbelt retainer about a vertical rotation axis.

9. The child restraint of claim 8, wherein the aperture is formed in a seat bottom of the juvenile seat in proximity to the seat-orientation controller when the juvenile seat is in the use position.

10. The child restraint of claim 7, wherein the seat base is formed to include the aperture leading to the seat lock.

11. The child restraint of claim 10, wherein the aperture is located at a front end of the seat base.

* * * * *